United States Patent
Pappone et al.

(10) Patent No.: US 8,948,334 B2
(45) Date of Patent: Feb. 3, 2015

(54) SYSTEM AND METHOD FOR TESTING THE STEAM SYSTEM OF A BOILING WATER REACTOR

(75) Inventors: Daniel Charles Pappone, San Jose, CA (US); Daniel Verne Sommerville, Soquel, CA (US); Teddy Earl McDowell, San Jose, CA (US); John Joseph Lynch, Greenville, SC (US); David Galbally, Madrid (ES); Venkat Arunachalam Ramani, San Jose, CA (US); Jeffrey H. Sanders, Santa Cruz, CA (US); Matthew Christopher O'Connor, Fremont, CA (US)

(73) Assignee: General Electric Company, Schenectady, NY (US)

( * ) Notice: Subject to any disclaimer, the term of this patent is extended or adjusted under 35 U.S.C. 154(b) by 1632 days.

(21) Appl. No.: 11/261,489

(22) Filed: Oct. 31, 2005

(65) Prior Publication Data

US 2007/0098131 A1   May 3, 2007

(51) Int. Cl.
*G21C 17/02* (2006.01)
*G21C 17/00* (2006.01)

(52) U.S. Cl.
CPC .......... *G21C 17/00* (2013.01); *G21Y 2002/204* (2013.01); *G21Y 2004/30* (2013.01); *G21Y 2002/201* (2013.01); *G21Y 2004/40* (2013.01); *G21Y 2002/502* (2013.01)
USPC .......................................... 376/245; 376/246

(58) Field of Classification Search
USPC ......... 376/210, 219, 246, 247, 245, 211, 216, 376/259; 267/140.13, 140.1, 140.11, 267/140.14; 417/44.2, 63, 420
See application file for complete search history.

(56) References Cited

U.S. PATENT DOCUMENTS

| | | | | |
|---|---|---|---|---|
| 3,665,964 A | * | 5/1972 | Brown et al. | 137/630.13 |
| 5,289,901 A | * | 3/1994 | Fargo | 187/275 |
| 5,682,410 A | * | 10/1997 | McGrady et al. | 376/246 |
| 5,887,043 A | * | 3/1999 | Spinks | 376/298 |
| 5,912,933 A | * | 6/1999 | Shaug et al. | 376/216 |
| 6,333,956 B1 | * | 12/2001 | Bittermann et al. | 376/283 |
| 6,987,826 B2 | * | 1/2006 | Casillas et al. | 376/245 |
| 7,444,246 B2 | * | 10/2008 | Bilanin et al. | 702/54 |
| 2006/0078081 A1 | * | 4/2006 | Bilanin et al. | 376/260 |

FOREIGN PATENT DOCUMENTS

| | | | | |
|---|---|---|---|---|
| JP | 10085161 | | * | 9/1996 |
| JP | 10085161 A | | * | 4/1998 |

(Continued)

OTHER PUBLICATIONS

GE Energy statement "steam dryer scale model Testing and Load Definition", www.gepower.com/prod_serv/products/nuclear_energy/en/downloads/steam_dryer_scale_model_testing.pdf).*

(Continued)

*Primary Examiner* — Jack W Keith
*Assistant Examiner* — Sean P Burke
(74) *Attorney, Agent, or Firm* — Harness, Dickey & Pierce PLC

(57) ABSTRACT

A system and method for predicting acoustic loads expected on a boiling water reactor (BWR) may include a BWR scale model, a test fixture for generating air flow in the scale model, and one or measurement devices for monitoring system behavior to predict how acoustic loads may affect plant operation for the BWR being evaluated.

11 Claims, 7 Drawing Sheets

(56) References Cited

FOREIGN PATENT DOCUMENTS

| SU | 1229506 | * | 5/1984 |
| SU | 1229506 A | * | 5/1986 |

OTHER PUBLICATIONS

Mitra et al., "Development of an Experimental Apparatus for Studying Fluid-Elastic Instability in Tube Arrays", boiling.seas.ucla.edu/Publications/conf_MAADC2002.pdf; MAADAC-2002.*

Takahashi et al., "Evaluation of flow-Induced Vibration for fixed type Guide Rods of Shroud Head and Steam Dryer in ABWR", Proc. of ICONE 10 10th Internat. Conf. on Nuclear Engineering, Arlington, VA, Apr. 14018, 2002.*

Busan, "Flutter model technology", WL-TR-97/3074, Flight dynamic directorate, WRIGHT Laboratory, 1998.*

Feenstra et. al.,("Fluid-Elastic Instability in a Tube Array Subjected to Uniform and Jet flow", Journal of Pressure Vessel Technology, May 2004, V. 128, 269-274.*

GE Energy statement "steam dryer scale model Testing and Load Definition" Nov. 2005, (www.gepowercom/prod_serv/products/nuclear_energy/en/downloads/steam_dryer_scale_model_testing.pdf.*

SYSNOISE prospect, LMS Publication nr, 4.0/2059/A20/11.96.*

Ohtsuka et al., "Study on Acoustic Resonance and Its Damping of BWR Steam Dome", ICAPP'06. Jun. 2006, p. 1.*

Translation of Soviet Union Patent Publication No. SU 1229506 ("Livada et al.").*

Axisa, F. , "A Decade of Progress in FLow-Induced Vibration." 1993.*

Busan, "Flutter Model Technology," Wright Laboratory, Jan. 1998.*

Feenstra, et al., "Modeling two-phase flow-excited damping and fluidistic instability in tube arrays," J. Fluids and Structures, Elsevier Science (2002) 16(6), pp. 811-840; doi:10.1006/jfls.442.*

Feenstra, et al., "Fluid-Elastic Instablity in a Tube Array Subjected to Uniform and Jet Flow," J. Press. Vess. Tech. May 2004, v. 128, p. 269-274.*

GE Energy Statement "Steam Dryer Scale Model Testing and Load Definition." (2005).*

Mitra et al., "Development of an Experimental Apparatus for Studying Fluid-Elastic Instability in Tube Arrays." Undated.*

Nakao et al., "Decreasing of Pressure Loss in BWR Steam Separator," Japanese J. Multiphase Flow, V. 15, N. 4, 2001.*

Office action for corresponding Spanish patent applciation, No. 200602760, dated Aug. 27, 2010.*

Ohtsuka et al., "Study on Acoustic Resonance and Its Damping BWR Steam Dome," ICAPP'06, Jun. 2006, p. 1.*

SYSNOISE prospect, LMS Publication Nr. 4.0/2059/A20/11.96.*

Takahashi et al., "Evaluation of Flow-Induced Vibration for Fixed Type Guide Rods of Shroud Head and Steam Dryer in ABWR," Proc. of ICONE 10, 10th Internat. Conf. On Nuc. Eng., Arlington, VA Apr. 14-18, 2002.*

Translation of SU 1229506.*

Search Report for corresponding Spanish patent application No. 200602760 dated Apr. 30, 2009.

Axisa, F., "A decade of progress in flow-induced vibration." Commissariat a l'Energie Atomique, Centre d'Etudes Nucléaires de Saclay, Gif-sur-Yvette, Francia. 1993 Elsevier Science Publishers B.V., pp. 1-20.

Feenstra et al., "Modelling two-phase flow-excited damping and fluidelastic instability in tube arrays," Journal of Fluids and Structures, Elsevier Science Ltd. (2002) 16(6), pp. 811-840 doi:10.1006/jfls.442.

Office Action for corresponding Spanish Patent Application No. 200602760 dated Aug. 27, 2010.

Nakao et al, "Decreasing of Pressure Loss in BWR Steam Separator," Japanese J. Multiphase Flow, vol. 15, No. 4, 2001.

* cited by examiner

Section B - B

SYSTEM AND METHOD FOR TESTING THE STEAM SYSTEM OF A BOILING WATER REACTOR

BACKGROUND OF THE INVENTION

1. Field of the Invention

The present invention relates generally to a method and apparatus for testing the steam system of a boiling water reactor (BWR), and more particularly, to a method and apparatus for performing tests on a scale model of the steam system of a scale BWR.

2. Description of the Related Art

A reactor pressure vessel (RPV) of a nuclear reactor such as a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the reactor core and is supported by a shroud support structure. The shroud has a generally cylindrical shape and surrounds both the core plate and the top guide. There is a space or annulus located between the cylindrical reactor pressure vessel and the cylindrically-shaped shroud.

Heat is generated within the core and water circulated up through the core is at least partially converted to steam. Steam separators separate the steam and the water. Residual water is removed from the steam by steam dryers located above the core. The de-watered steam exits the RPV through a steam outlet near the vessel top head.

Conventional BWRs can experience damage resulting from aero-acoustic loading of the steam dryer during operation. Some conventional BWRs have experienced significant degradation of the steam dryer after operating at power levels in excess of the original licensed thermal power. For example, the aero-acoustic loading of the steam dryer can result in vibration of the steam dryer during operation, which may manifest as unusual wear or in some cases cracking of steam dryer components.

Steam dryer damage can prevent the plant from operating at a desired power level. Further, costs (time, money, etc.) associated with repairs to the steam dryer can be significant. Accordingly, it is desirable to be able to predict the nature of acoustic loads expected on a BWR steam dryer.

Conventionally, there are several methods used to predict the nature of the acoustic loads expected on BWR steam dryers. These methods include (1) empirical generic load estimates based on in plant operating data from different BWR configurations and different operating conditions; (2) plant specific in-vessel instrumentation programs to measure acoustic loads at various power levels; (3) acoustic circuit models of a plant configuration driven by in-plant data obtained at desired power level from instrument lines or main steam line strain gauges; and (4) Computational Fluid Dynamics (CFD) analyses performed for a plant specific configuration.

The empirical generic load estimate is inaccurate and hampered by the fact that the data is obtained from reactor plants other than the plant considered. Thus, no plant-specific information is used to determine if the load estimate is conservative or non-conservative for the plant being considered. This method uses all information available from a BWR steam system in an attempt to produce an acoustic load definition for any plant. The suitability of this method for plant specific applications is difficult to demonstrate. Many utilities complain that the load prediction is too conservative. The Nuclear Regulatory Commission (NRC) complains that the empirical method is not sufficient to differentiate between plants that have experienced steam dryer failures and plants which have not.

In some cases, utilities have decided to pursue in-vessel instrumentation programs to measure actual loads on the steam dryer. However, this method is expensive, which makes it an undesirable approach for many utilities. Further, this method is channel limited, meaning that a limited number of instruments may be placed on the steam dryer to obtain operating data. This number is typically around 40 instrument locations. Use of in-vessel instrumentation also requires that the critical regions of the steam dryer be known prior to the time that the in-vessel tests are performed. Further, there is no opportunity to relocate instruments once the reactor is back online and operational.

Further, some organizations have created acoustic circuit approximations of a plant specific steam system. These analytical models are effectively transfer functions used to predict acoustic loads on the steam dryer from unsteady pressure data obtained from instrumentation lines attached to the RPV, main steam lines or main steam line strain gauges. The acoustic circuit models and methods cannot be used to predict plant-specific loads unless data is obtained from the plant at the operating conditions of the desired acoustic load conditions. The unsteady pressure data is obtained at the end of instrumentation lines containing both liquid water and steam, and thus exhibits significant thermal gradients. The condition of the instrument lines makes an accurate prediction of the unsteady pressure in the steam lines difficult to verify. Additionally, use of main steam line strain gauges provides data that contains mechanical signals introduced into the desired acoustic pressures by main steam line vibration; thus a large number of strain gauges and significant signal processing care must be taken to apply this method. In other words, prediction of the system response in one portion of the system using the response from another portion of the system, without a complete understanding of the location and characteristics of all acoustic sources, makes it difficult to verify the load predictions obtained with this method.

Some CFD analyses have been performed in an effort to understand the loading expected on the steam dryer. However, the lack of empirical data to benchmark this approach, the physical size of the model required to approximate the steam system, and the computational resources required to make an accurate prediction of unsteady pressure oscillations on the steam dryer prevent this approach from being practical. This technology is not yet mature enough to be used for an industrial problem of the complexity exhibited by the BWR steam system.

SUMMARY OF THE INVENTION

An example embodiment of the present invention is directed to a system for predicting acoustic loads expected on a BWR and components thereof. The system may include a BWR scale model, a test fixture configured to generate air flow in the scale model, and one or more measurement devices for monitoring the behavior of the system.

Another example embodiment of the present invention is directed to a method of predicting acoustic loads expected on a BWR steam dryer. The method includes providing a scale model of the BWR to be evaluated, generating airflow through the scale model, and monitoring system behavior of the scale model to predict how acoustic loads affect plant operation at the BWR being evaluated.

Another example embodiment of the present invention is directed to a method of predicting acoustic loads expected on BWRs. The method includes using scaling relationships derived from dimensional analysis to convert data obtained from a BWR scale model to plant conditions.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the present invention.

DETAILED DESCRIPTION OF THE EXAMPLE EMBODIMENTS

Example embodiments of the present invention as will be described in further detail hereafter are directed to a system and method for determining acoustic loads in the main steam system of a BWR. More specifically, example embodiments of the present invention are directed to performing tests on a scale model of the steam system of a BWR to determine acoustic loads which may occur during operation.

Figure 1:
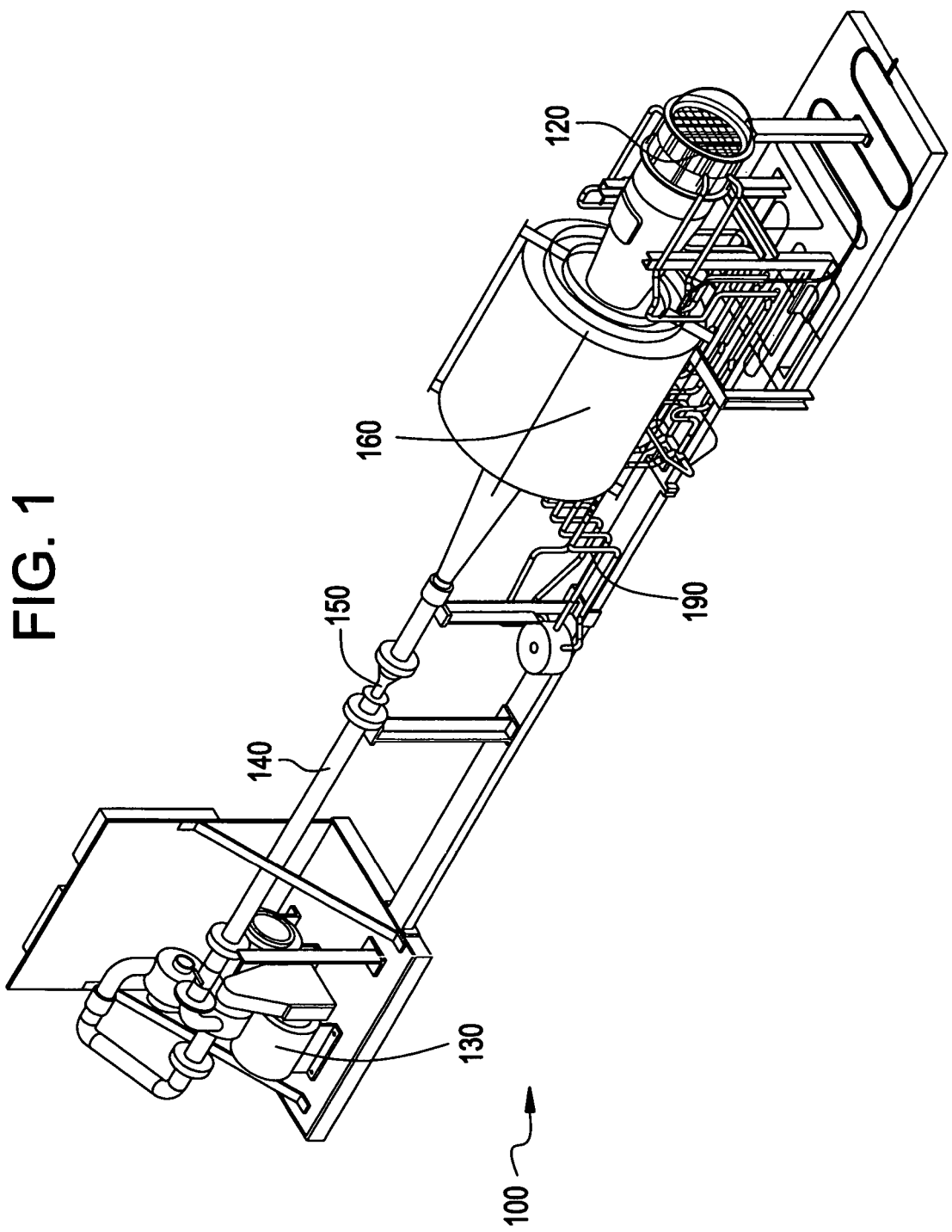
FIG. 1 illustrates a schematic of an example BWR scale model acoustic test system.
Figure 2:
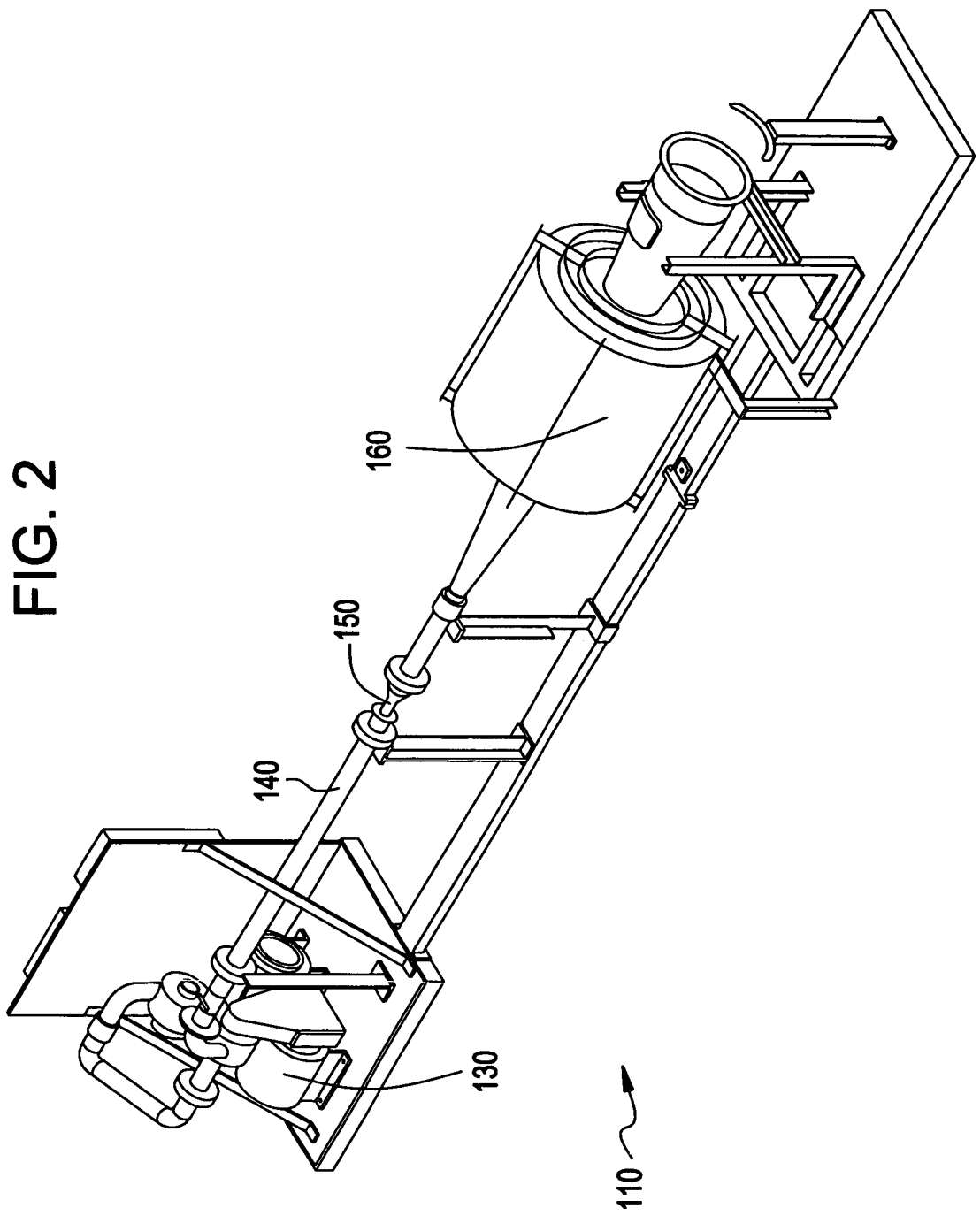
FIG. 2 illustrates an example test fixture in accordance with an example embodiment of the present invention.
Figure 3:
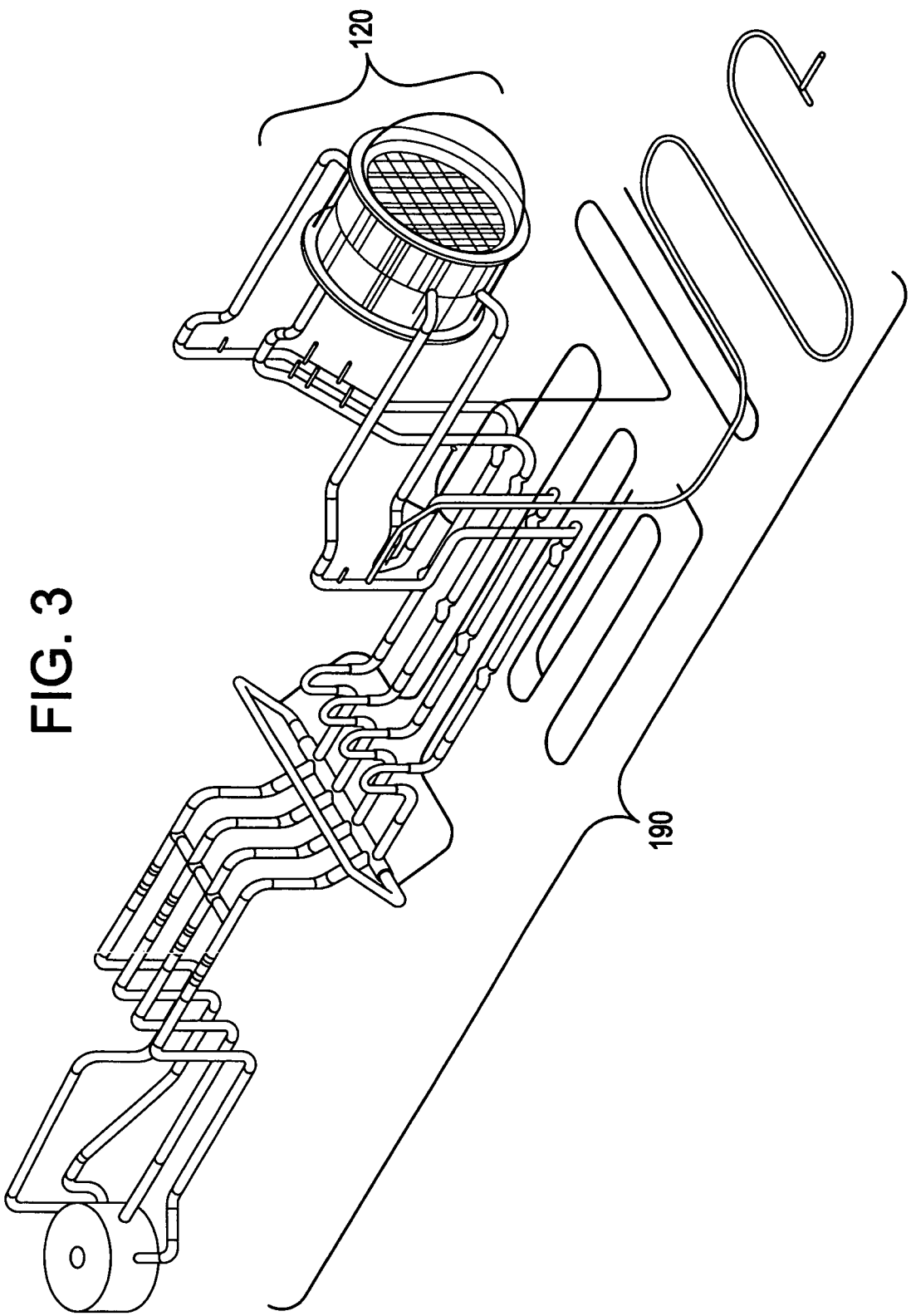
FIG. 3 illustrates model main steam lines connected to a BWR scale model in accordance with an example embodiment of the present invention.

FIG. 1 is a schematic of an example BWR scale model acoustic test system 100. FIG. 2 illustrates an example test fixture 110, and FIG. 3 illustrates an example of model main steam lines 190 connected to the BWR scale model 120 of the BWR scale model acoustic test system 100 (as depicted in FIG. 1). The BWR scale model acoustic test system 100 is based in part on a premise that the system acoustics are governed by system geometry and fluid properties.

Accordingly, characteristic modes of the scale model acoustic test system 100 can be related to those of a reactor plant to be evaluated through appropriate scaling relationships derived using dimensional analysis of the governing fluid equations. These relationships are obtained from an engineering first principles approach. Significant factors to be considered in design and operation of the scale model include preservation of the fluid Mach number in the model and plant and maintaining a consistent geometric scale. In other words, if all aspects of the BWR and main steam line scale models 120 and 190 are built to the same arbitrary scale and the model air flow Mach number is the same as the plant steam flow Mach number, then the normal acoustic modes in the BWR and main steam line scale models 120 and 190 will be proportionately related to the normal acoustic modes in the plant being evaluated through the following relationship in expression (1):

$$\frac{f_{Plant}}{f_{Test}} = \left(\frac{d_{Test}}{D_{Plant}}\right)\left(\frac{C_{Plant}}{C_{Test}}\right) \quad (1)$$

Similarly, the model pressures may be related to the plant pressures by expression (2):

$$\frac{P_{Plant}}{P_{Test}} = \left(\frac{P_{Plant}}{P_{Test}}\right)\left(\frac{C_{Plant}}{C_{Test}}\right)^2 \quad (2)$$

Accordingly, scaling relationships derived from dimensional analysis may be used to convert data obtained from a model to plant conditions.

The BWR scale model acoustic test system 100 may include a test fixture 110 and a BWR and main steam line scale model 120 and 190. The test fixture 110 may include components for generating air flow and routing the air flow to the BWR scale model 120.

As shown in FIG. 2, test fixture 110 may include a blower 130, inlet piping 140, a flow meter 150 and a muffler 160. The blower 130 is configured to provide air flow, which may be routed through the inlet piping 140 into the BWR scale model 120. The air flow generated by the blower 130 is used to simulate flow in the BWR scale model 120 (as depicted in FIGS. 1 and 3) similar to the flow generated in an operating BWR that results in acoustic loads, which as discussed above could result in a variety of problems.

An example blower 130 could be an electrical centrifugal blower such as a Sonic 70 Centrifugal Blower The inlet piping 140 connects the blower 130 to the BWR scale model 120 (as depicted in FIGS. 1 and 3). The inlet piping 140 may be composed of various sections that may be tailored (e.g. the size and material may vary) depending on the environment and characteristics of the components (e.g., blower 130, flow meter 150, BWR scale model 120, muffler 160, etc.) that the inlet piping 140 connects together.

The flow meter 150, which may be embodied as a venturi flow measurement device, and muffler 160 may be located between the blower 130 and the BWR scale model 120. The flow meter 150 may be used to measure the system air flow. The flow meter 150 measurements may be monitored, recorded, and/or used as part of a control mechanism for the BWR scale model test system 100. For example, measurements from the flow meter 150 may be used to control the blower 130. Further examples of measurement devices, locations thereof, and uses thereof will be described later.

The muffler 160 may be used to substantially isolate the BWR model 120 from noise introduced into the system by the test fixture 110. For example, noise generated by the test fixture 110 may include the blower 130 Vane Passing Frequency (VPF), organ pipe modes associated with inlet piping 140, etc. The muffler 160 may be an absorptive muffler such as used in Heating Ventilation and Air Conditioning systems, for example.

A method of predicting acoustic loads expected on a BWR steam dryer may include providing a BWR scale model 120 to be evaluated and generating airflow through the BWR scale model 120. System behavior of the BWR scale model 120 may be monitored to predict how acoustic loads affect plant operation at the BWR being evaluated. Monitoring may further include monitoring one or more of pressure oscillations in the BWR scale model test system 100, total air flow of the BWR scale model test system 100, absolute static air pressure in the BWR scale model test system 100, and air temperature in the BWR scale model test system 100, and/or adjusting one or more adjustable components (e.g., pipe length adjuster 200, relief valve inlet length adjuster 300, etc.) recording measurements, and/or further adjusting one or more adjustable components and recording additional measurements, thereby obtaining parametric data for the BWR scale model test system 100.

Figure 4:
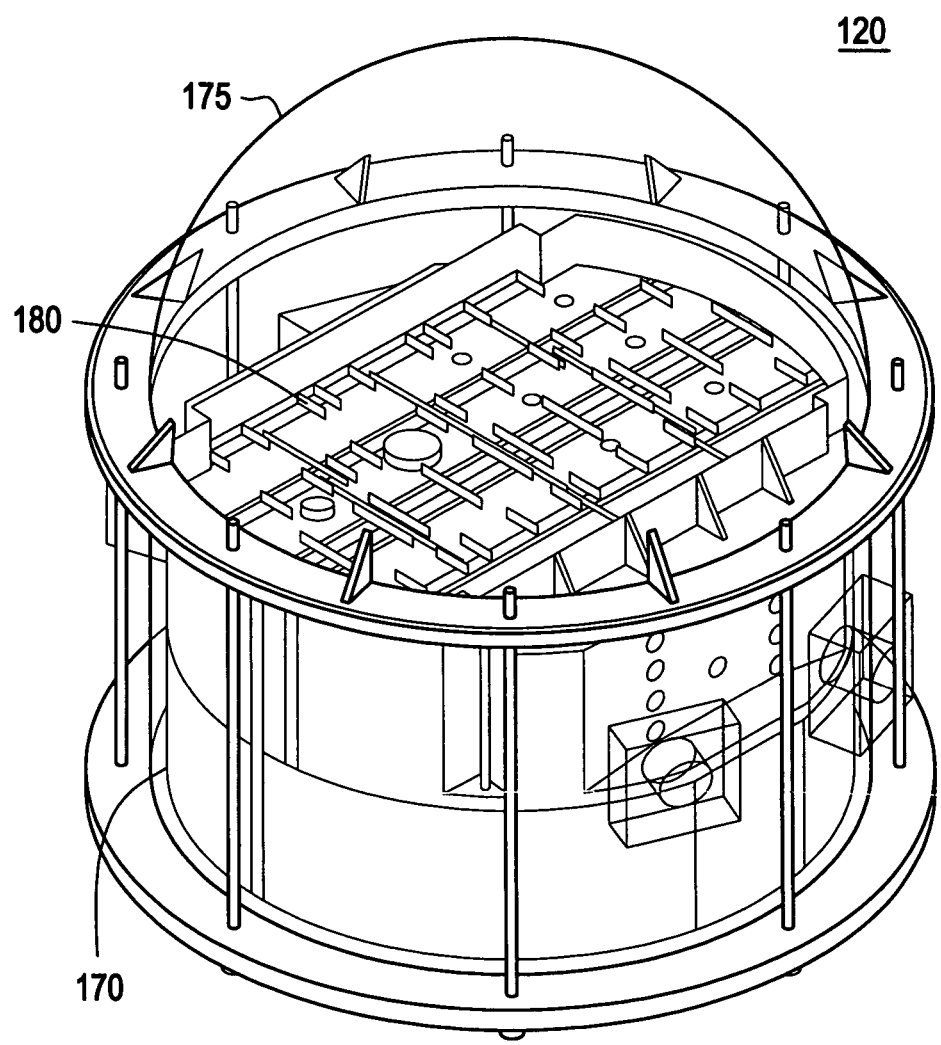
FIG. 4 illustrates an example BWR scale model in accordance with an example embodiment of the present invention.

As shown in FIG. 4, the BWR scale model 120 may include a scale version of a RPV 170, a steam dryer 180 and RPV top head 175. The scale to be used for the BWR scale model 120 may be determined by the flange diameter at the outlet of the muffler 160, for example. The material selected to fabricate the BWR scale model 120 should prevent air from leaking through the steam dryer 180 surfaces, the RPV 170 and the top head 175. Accordingly, any material capable of withstanding about two to five pounds per square inch of internal pressure (gauge) may be suitable for fabricating the BWR scale model 120. Example materials for the BWR scale model 120 include acrylic for the RPV 170 and nickel plated polymer for the steam dryer 180. The top head 175 of RPV 170 may be stainless steel. The model main steam lines 190 may also be stainless steel. These are merely illustrative of the different components of the BWR scale model 120 and model main steam lines 190 and should not limit the invention in any way.

Figure 5:
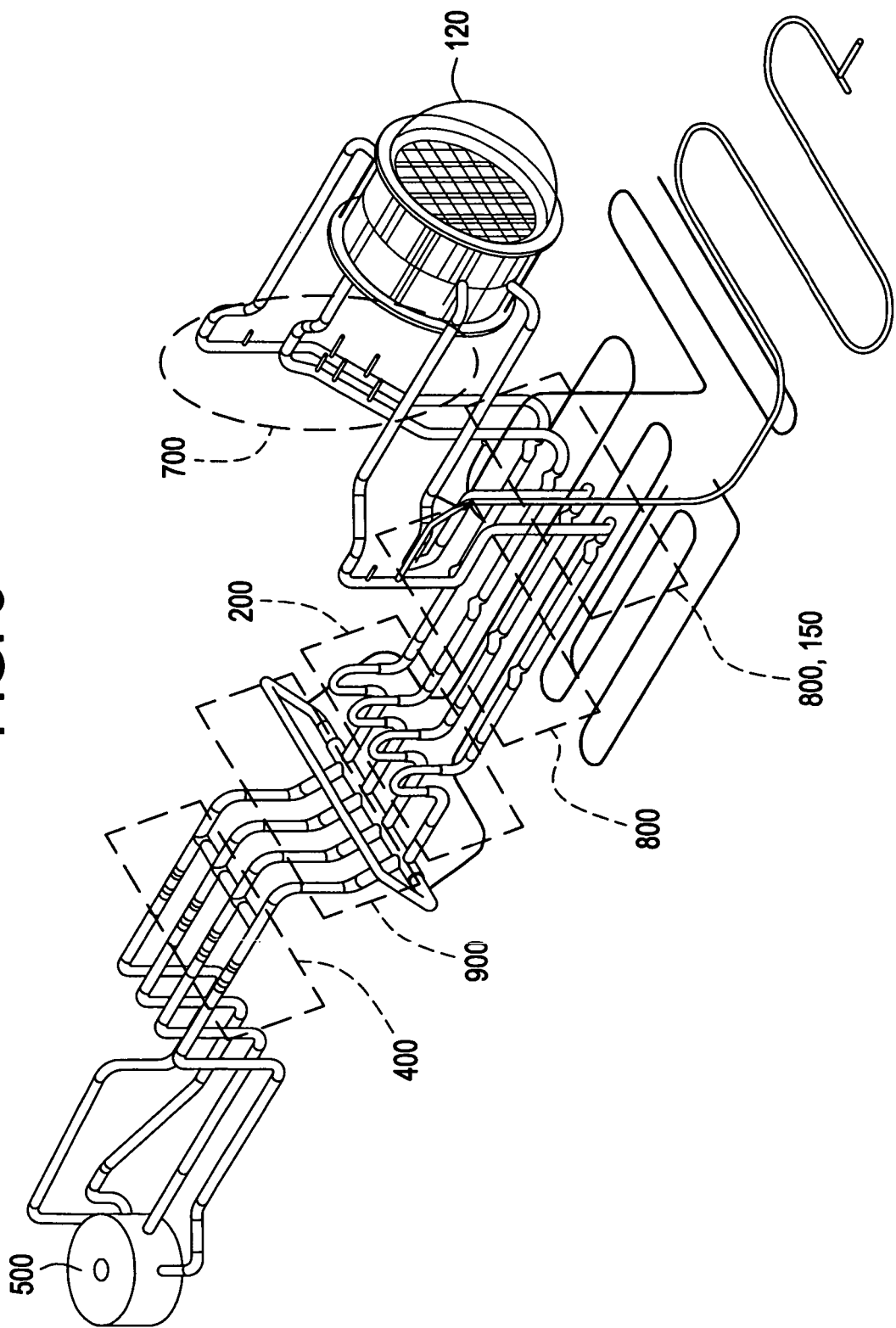
FIG. 5 illustrates an example embodiment of a model steam system connected to a BWR scale model in accordance with an example embodiment of the present invention.

FIG. 5 is an example BWR scale model 120 including model main steam lines 190 attached to the BWR scale model 120. The model main steam lines 190 may connect the one or more turbine inlets 500 to the BWR scale model 120. The model main steam lines 190 may include turbine valves 400 (e.g., turbine stop valves, turbine control valves, etc.) pipe length adjusters 200, equalizing header 900, main steam isolation valves 800, flow meters 150, and safety and relief valves 700.

The example model components described above may function to control the characteristics of the steam system. However, the model valves (e.g., turbine valves 400, pipe length adjusters 200, equalizing header 900, main steam isolation valves 800, flow meters 150, and safety and relief valves 700) may or may not have the same function as valves included in an operational BWR. For example, the model safety and relief valves 700 may be used only to model an acoustic cavity of an operational BWR and not designed to fulfill an overpressure protection function in a BWR scale model acoustic test system 100.

The model main steam lines may be designed with unions such that the system may be disassembled at various locations in the model main steam lines 190. This allows various components to be removed from the system enabling the model to be used for identification of the aero-acoustic sources. Further, the system may be designed so that any valve in the model main steam lines 190 (e.g., main steam isolation valves, turbine stop valves, turbine control valves, etc.) may be included with an adjustable component to investigate its effect on the system behavior.

The pipe length adjusters (e.g., pipe length adjusters 200, relief valve inlet adjusters 300, etc.) may be used to adjust the characteristics of the steam system connected to the BWR scale model 120.

Figure 6:
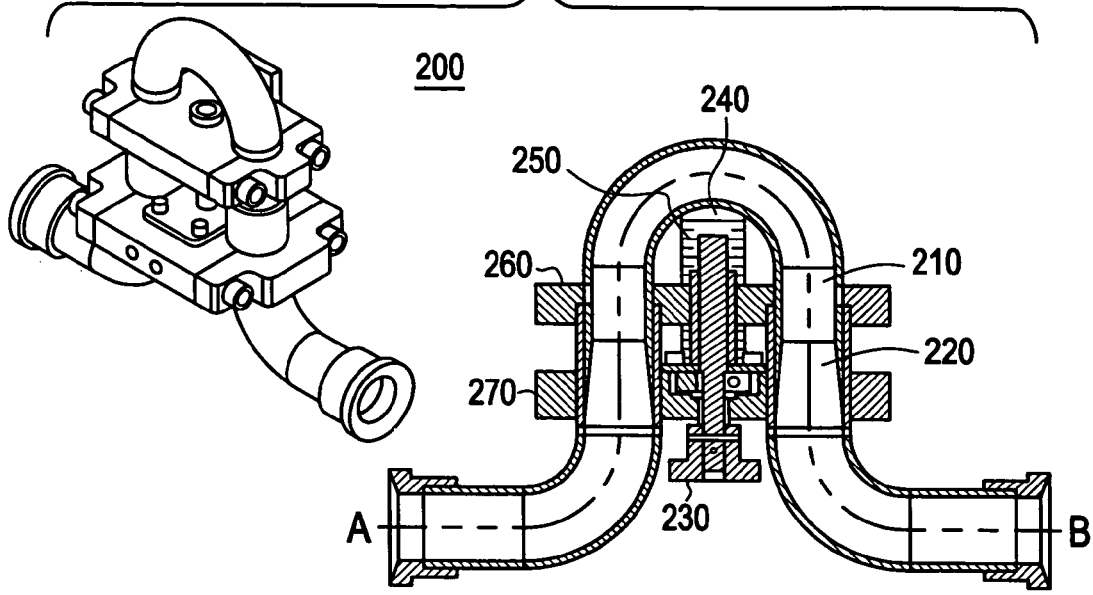
FIG. 6 illustrates a pipe length adjuster in accordance with an example embodiment of the present invention.

FIG. 6 illustrates an example embodiment of a pipe length adjuster 200 that may be used in the present invention. In FIG. 6, the pipe length adjuster 200 is configured to increase and/or reduce the overall path length of the steam lines connected to the scale model BWR 120. As shown in FIG. 6, pipe length adjuster 200 may include a first pipe section 210, a second pipe section 220, a pipe length adjusting device 230, a length adjustment setting device 240, a first bracket 260, second bracket 270, and O-rings. The first pipe section 210 may be configured for insertion into the second pipe section 220 of the pipe length adjuster 200 or vice versa. The pipe length adjusting device 230 may be connected to the first pipe section 210 and the second pipe section 220. Pipe length adjusting device 230 is configured to insert and retract the first pipe section 210 to and from second pipe section 220, thereby changing the path length from point A to point B pipe length adjuster 200, as shown in FIG. 6.

The length adjustment setting device 240 may provide a read out to the user representing the length adjustment. The length adjustment setting device 240 includes reference lines 250 used to determine the length to be adjusted by the pipe length adjusting device 230. As the pipe length adjusting device 230 is adjusted to increase the distance between first bracket 260 and second bracket 270, the amount of first pipe section 210 that is inserted into the second pipe section 220 is reduced, thereby increasing the path length between point A and point B. As shown in FIG. 6, the reference lines 250 included on the length adjustment setting device 240 may be used in connection with first bracket 260 to determine the amount that path length between points A and B is increased. O-rings may be used to seal the interface between 210 and 220 to prevent air from leaking out of the system during operation.

Figure 7:
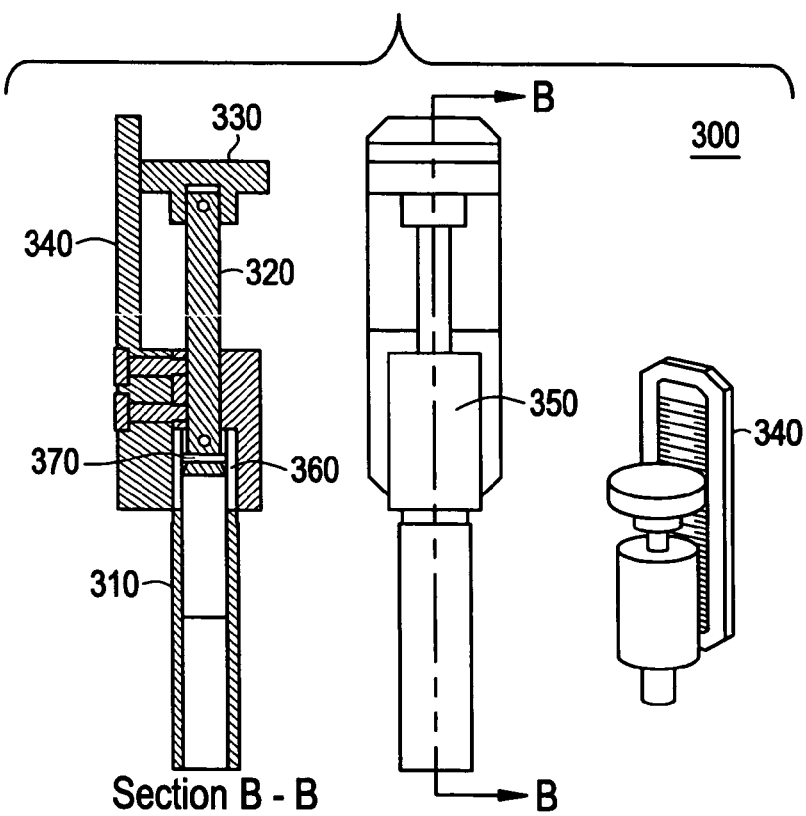
FIG. 7 illustrates a relief valve inlet length adjuster in accordance with an example embodiment of the present invention.

FIG. 7 is an example of a model valve adjuster according to an example embodiment of the present invention. In FIG. 7, the model relief valve inlet length adjuster 300 is illustrated in both a fully inserted and fully retracted position. The relief valve inlet length adjuster 300 may include a valve pipe 310, valve insert 320, valve insert top 330, valve length setting device 340, valve housing 350, and valve seat 360. The relief valve inlet length adjuster 300 may be configured to adjust the effective length of the relief valve inlets. For example, the valve insert 320 may be configured to be adjustably inserted into the valve pipe 310, thereby varying the effective length of the relief valve. Length adjustment is obtained by turning valve insert top 330 which is attached to a threaded shaft 320 and valve seat 360. As 330 is turned, 320 threads either up or down into the model valve housing 350 which causes the valve seat 360 to move into or out of the valve pipe 310. An O-ring seal 370 may prevent air from leaking between the valve pipe 310 and the valve seat 360.

Valve length adjustment setting device 340 may be used in connection with the valve insert top 330 to determine the effective length of the relief valve. As the valve insert top 330 is turned and the valve seat 360 moves into or out of the valve pipe 310, the length of the valve cavity is read from a scale on the valve length setting device 340.

Figure 8:
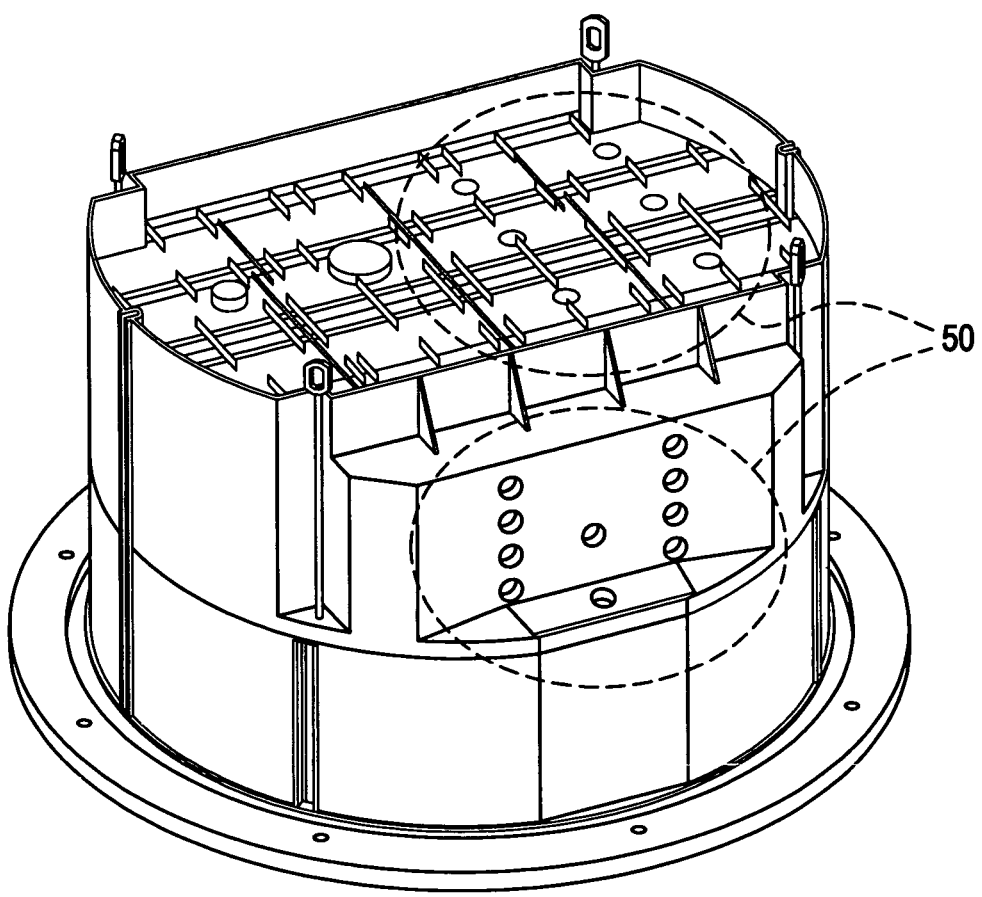
FIG. 8 illustrates a scale steam dryer model including measurement devices mounted thereon in accordance with an example embodiment of the present invention.

FIG. 8 is an example scale model steam dryer with measurement devices 50 mounted thereon. The measurement devices 50 may be embodied as one or more of pressure, temperature, flow, etc. to measure a variety of characteristics. While the measurement devices 50 are illustrated as being located on the steam dryer 180, it should be noted that measurement devices 50 may located on various components of the BWR scale model 120, main steam lines 190, and locations on the test fixture 110. The measurement devices 50 can be located anywhere in BWR scale model acoustic test system 100 where it is desirable to obtain data. Further, because ambient air is used as the test fluid it is easy to add and remove sensors because a sensor location can be easily added or removed by adding or plugging a sensor hole.

It will be evident to one of ordinary skill in the art that the measurement devices could be embodied by any suitable device configured to measure one or more desired characteristics. For example, one or more of the measurement devices 50 may be configured to measure pressure oscillations of the steam dryer model; and/or one or more of the measurement devices 50 may be a microphone (not shown) mounted such that a sensor diaphragm (not shown) of the microphone is flush with the outer surface of the steam dryer 180 to measure unsteady pressure oscillations; one or more of the measurement devices 50 may be a pressure transducer configured to monitor the absolute static air pressure in the steam dryer 180; and one or more of the measurement devices 50 may be a temperature sensor configured to monitor the air temperature of the steam dryer 180.

Further, the measurements of the measurement devices may be recorded, monitored, and used to control the BWR scale model acoustic test system 100. A data acquisition system may be used to record, monitor and analyze time history data acquired from one or more of the measurement devices. For example, the time history data measured from the model steam dryer may be used to form steam dryer fluctuating loads. Further, time history data measured from other locations in the model steam system can be used to identify aero-acoustic source locations and excitation mechanisms.

The example apparatus and methodology may allow utilities to obtain plant-specific data, may be designed and fabricated for less money than conventional plant-specific test programs, and may allow more sensor locations than are possible for existing in-vessel test. Further, use of the example BWR scale model acoustic test system 100 may prevent a plant from operating at a power level for which loads are not currently known. This is because the test can be completed using the BWR scale model acoustic test system 100. Using the conventional acoustic circuit model approach, the plant power level must be raised to obtain data. Therefore, if damaging loads exist at the adjusted power level, structural fatigue of the actual BWR may occur resulting in necessary repairs and/or replacement of components.

The example BWR scale model acoustic test system 100 may also permit parametric studies to be performed, thus enabling a utility to predict possible problems and then design acceptable repairs, if necessary, prior to operating a plant associated with the scale model at potentially damaging power levels.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed:

1. A system for monitoring the effect of acoustic loads expected on boiling water reactor (BWR) steam dryers comprising:
    a BWR scale model, the BWR scale model including a scale model of a reactor pressure vessel and a system dryer;
    a test fixture located upstream of the BWR scale model, the test fixture configured to generate and supply air flow, and associated acoustic loads, into the BWR scale model;
    at least one measurement device attached to the BWR scale model and configured to monitor system behavior of the BWR scale model to predict how acoustic loads affect plant operation at the BWR; and
    at least one main steam line located downstream of the BWR scale model,
    wherein the at least one main steam line includes at least one adjustable component, the adjustable component including at least one of a pipe length adjuster and a relief valve inlet length adjuster.

2. The system according to claim 1, wherein the pipe length adjuster includes a length adjustment setting device configured to insert or retract a first pipe section into and out of a second pipe section to vary the effective length of the pipe length adjuster, wherein the relief valve inlet length adjuster includes a valve length setting device configured to cause a valve seat to move in and out of valve piping to vary the effective length of the relief valve inlet length adjuster.

3. The system according to claim 1, wherein the test fixture includes at least one blower configured to generate the air flow.

4. The system according to claim 1, wherein the test fixture further includes inlet piping configured to convey air from the test fixture into the scale model, and a muffler configured to connect the test fixture to the scale model and to reduce noise introduced into the system by the test fixture, and wherein the inlet piping also is configured to transfer air into the muffler.

5. The system according to claim 1, wherein the at least one measurement device is configured to measure pressure oscillations in the system.

6. The system according to claim 1, wherein at least one measurement device includes one or more of a flow meter configured to measure system air flow, a pressure transducer configured to monitor the absolute static air pressure in the scale model, and a temperature sensor configured to monitor the air temperature in the system.

7. The system according to claim 1, wherein the at least one main steam line includes at least one additional component, the at least one additional component including one of a main steam isolation valve, a turbine stop valve, and a turbine control valve.

8. The system according to claim 1, wherein the BWR scale model is manufactured from a material capable of withstanding about one to five pounds per square inch (gauge) of internal pressure.

9. The system of claim 1, wherein the air flow generated in the BWR scale model has a Mach number that is substantially the same as an expected steam flow Mach number in the BWR steam dryers.

10. A system for monitoring the effect of acoustic loads expected on boiling water reactor (BWR) steam dryers, comprising:
    a BWR scale model, the BWR scale model including a scale model of a reactor pressure vessel and a system dryer;
    a test fixture located upstream of the BWR scale model, the test fixture configured to generate and supply air flow, and associated acoustic loads, into the BWR scale model;
    at least one measurement device attached to the BWR scale model and configured to monitor system behavior of the BWR scale model to predict how acoustic loads affect plant operation at the BWR; and
    at least one main steam line located downstream of the BWR scale model,
    wherein the at least one main steam line includes at least one adjustable component that is a relief valve inlet length adjuster, wherein the relief valve inlet length adjuster includes a valve length setting device configured to cause a valve seat to move in and out of valve piping to vary the effective length of the relief valve inlet length adjuster.

11. A system for monitoring the effect of acoustic loads expected on boiling water reactor (BWR) steam dryers, comprising:

a BWR scale model, the BWR scale model including a scale model of a reactor pressure vessel and a system dryer;

a test fixture located upstream of the BWR scale model, the test fixture configured to generate and supply air flow, and associated acoustic loads, into the BWR scale model;

at least one measurement device attached to the BWR scale model and configured to monitor system behavior of the BWR scale model to predict how acoustic loads affect plant operation at the BWR; and at least one main steam line located downstream of the BWR scale model, wherein the at least one main steam line includes at least one adjustable component that is a pipe length adjuster, wherein the pipe length adjuster includes a length adjustment setting device configured to insert or retract a first pipe section into and out of a second pipe section to vary the effective length of the pipe length adjuster.

* * * * *